US006499564B2

(12) United States Patent
Puglisi

(10) Patent No.: US 6,499,564 B2
(45) Date of Patent: Dec. 31, 2002

(54) PORTABLE STEP

(76) Inventor: Kenneth Lee Puglisi, 6225 Rte. 88, Finleyville, PA (US) 15332

( * ) Notice: Subject to any disclaimer, the term of this patent is extended or adjusted under 35 U.S.C. 154(b) by 0 days.

(21) Appl. No.: 09/798,446

(22) Filed: Mar. 2, 2001

(65) Prior Publication Data

US 2002/0121760 A1 Sep. 5, 2002

(51) Int. Cl.[7] .............................. E04G 3/10; B60R 3/00
(52) U.S. Cl. ........................ 182/150; 182/127; 280/163
(58) Field of Search .................................. 182/150, 127, 182/92, 95, 90, 196–199, 206, 88, 91, 195; 296/62; 280/163, 165, 166

(56) References Cited

U.S. PATENT DOCUMENTS

| 4,108,457 | A | * | 8/1978 | Garrett | 280/166 |
| 4,757,876 | A | * | 7/1988 | Peacock | 182/127 X |
| 4,846,487 | A | * | 7/1989 | Criley | 280/166 |
| 5,205,603 | A | * | 4/1993 | Burdette, Jr. | 296/62 |
| 5,624,127 | A | * | 4/1997 | Arreola et al. | 182/127 X |
| 5,803,523 | A | * | 9/1998 | Clark et al. | 296/62 X |
| 5,941,342 | A | * | 8/1999 | Lee | 182/127 X |
| 6,270,139 | B1 | * | 8/2001 | Simpson | 296/62 |

* cited by examiner

Primary Examiner—Daniel P. Stodola
Assistant Examiner—Hugh B. Thompson
(74) Attorney, Agent, or Firm—Cohen & Grigsby, P.C.

(57) ABSTRACT

A portable step in which a step (64) is connected to the rails (48 and 50). The rails are connected to an anchor (20) by connecting member (76 and 78). The rails are also engaged with extension members (88 and 90) that have respective feet (92 and 94). Pins (112 and 114) secure extension member (88 and 50) in the rails (48 and 50).

20 Claims, 2 Drawing Sheets

PORTABLE STEP

BACKGROUND OF THE INVENTION

1. Field of the Invention

The presently disclosed invention relates to portable steps and, more particularly, to steps for entering or leaving the cargo area of a motor vehicle, especially the bed of a pickup truck.

2. Description of the Prior Art

In the prior art, there have been many application for portable steps. For example, the difficulties and inconvenience of repeatedly entering and exiting the bed of a pickup truck has been a persistent problem. In particular, construction contractors and others who have a need for frequent or ongoing access to the truck bed have found it difficult and tiresome to continually climb in and out of the truck bed from the level of the ground or other surface that supports the tires of the truck.

It has been known in the prior art to sometimes provide concrete blocks or similar materials to form a step adjacent to the truck by which entry to and exit from the truck can be more easily achieved. However, these temporary steps are not always convenient to assemble due to a variety of causes, such as a lack of space or unavailability of materials. Moreover, in many applications, such steps can be unstable and create a safety hazard by contributing to potential falls.

Accordingly, there was a need in the prior art for a portable step that could be quickly erected that could be reliably and safely used for ingress to and egress from the truck bed. Also, it was necessary for the step to be mechanically adjustable so that it could accommodate uneven terrain or various surface conditions at the places where the steps were applied.

SUMMARY OF THE INVENTION

In accordance with the presently disclosed invention, a portable step includes an anchor that is releasably connectable to a vehicle. This anchor is connected to first and second rails by respective first and second connecting members. At least one step is connected to the first and second rails. Each of the first and second rails respectively engage first and second extension members in longitudinally sliding relationship. A first locking means secures the first extension member in the first rail and a second locking means secures the second extension member in the second rail.

Preferably, the first and second connecting members comprise first and second flexible members such as chains.

Also preferably, the first and second rails comprise tubular members that define respective internal passageways wherein the first and second extension members are received.

More preferably, the first and second locking means comprise pins and the first and second rails have at least one hole and the first and second extension members each have a linear array of holes. The first locking means cooperates with a hold in the first rail and at least one hole in the first extension member that is in registry with the hole in the first rail to lock the first extension member in longitudinal position with respect to the first rail., Other details, objects and advantages of the presently disclosed invention will become apparent to the skilled in the art as a presently preferred embodiment of the invention proceeds.

BRIEF DESCRIPTION OF THE DRAWINGS

A presently preferred embodiment of the invention that is disclosed herein is shown and described in connection with the following drawings wherein.

DESCRIPTION OF A PREFERRED EMBODIMENT

Figure 1:
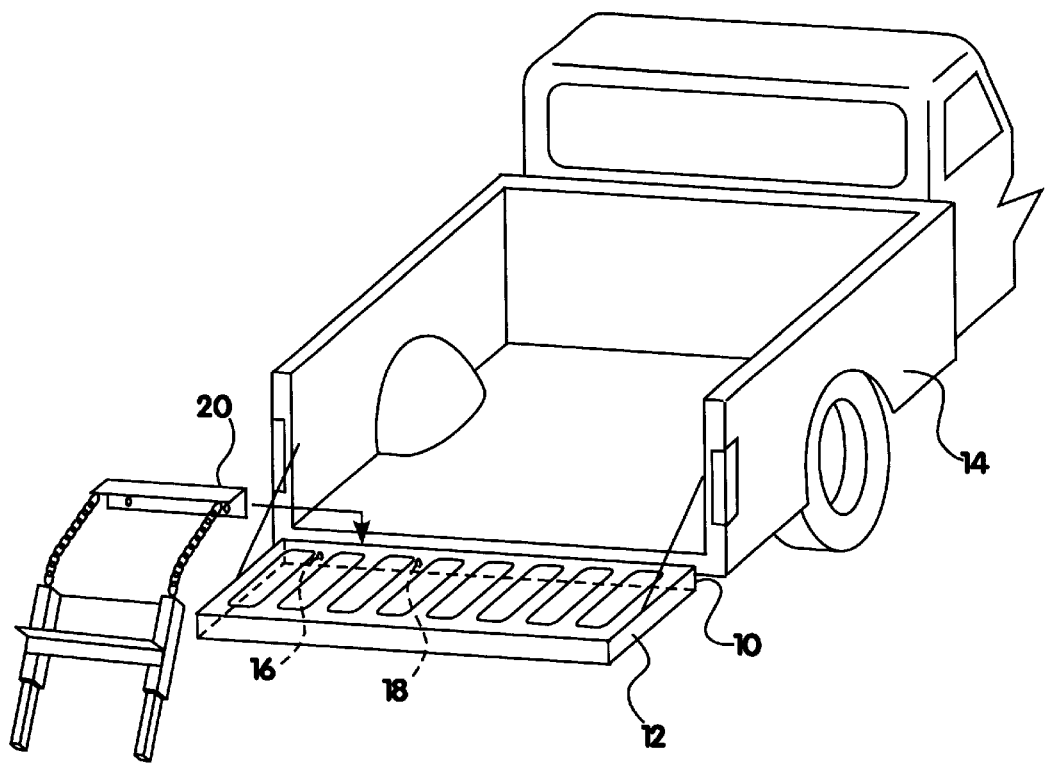
FIG. 1 is an projection of the portable step as it is applied to a pickup truck.
Figure 2:
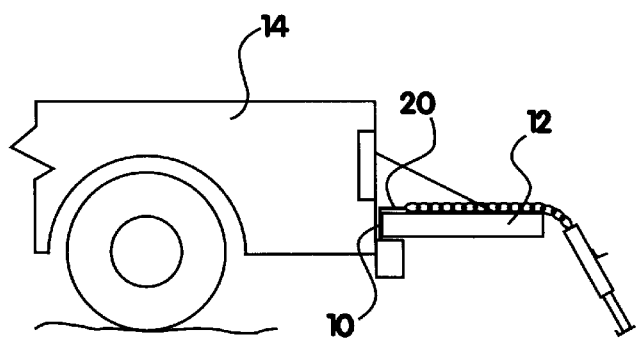
FIG. 2 is a side view of the portable step that is shown in FIG. 1.
Figure 3:
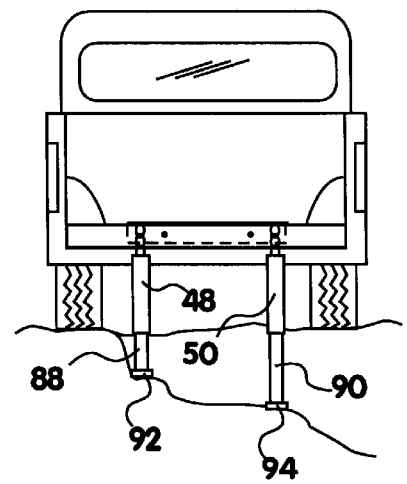
FIG. 3 is an end view of the portable step that is shown in FIGS. 1 and 2.

As shown in FIGS. 1–3, the presently disclosed portable step is connected to the inside edge 10 of the tail gate 12 on a pickup truck 14. The inside edge 10 of the tailgate 12 is provided with two holes 16 and 18 by which the portable step engages the pickup truck 14 as hereinafter more fully explained.

With particular regard to FIGS. 1–4, the adjustable step includes an anchor 20 that secures the step to the pickup truck 14. Anchor 20 is comprised of two generally rectangular strips of steel 22 and 24. Strip 22 defines a major edge 26 and minor edges 28 and 30. Strip 24 defines a major edge 32 and minor edges 34 and 36. Strips 22 and 24 are joined along a common major edge 38. Strip 22 defines a face 40 and strip 24 also defines a face 42. Strips 22 and 24 are oriented with respect to each other such that face 40 is angularly oriented with respect to face 42 along the longitudinal axis 43 of the common major edge 38. Face 40 of strip 22 cooperates with face 42 of strip 24 to define an angle a between faces 40 and 42. In the preferred embodiment of the presently disclosed invention, angle a is substantially 90° although strips 22 and 24 could be angularly oriented to alternatively define angles other than 90°.

Face 40 of strip 24 includes pins 44 and 46 which are members for engaging tailgate 12 of truck 14. Pins 44 and 46 are cross-sectionally dimensioned to fit within the diameter of holes 16 and 18 in tailgate 12. In this way, anchor 20 engages truck 14 to secure the portable step to the truck.

The portable step further includes two rails 48 and 50 which serve as siderails of the step. Rails 48 and 50 are tubular members in which walls define respective internal passageways 52 and 54. As shown in FIGS. 1–4, passageways 52 and 54 are generally square in cross-section although other cross-sectional shapes are also within the scope of the presently disclosed invention. Rail 48 has first end 56 and second end 58. Rail 50 has first end 60 and second end 62.

In the preferred embodiment, a step 64 is connected to rails 48 and 50. Specifically, step 64 has one end 66 that is connected to rail 48 at a longitudinal position along rail 48 that is between first end 56 and second end 58. Step 64 also has another end 68 that is connected to rail 50 at a longitudinal position along rail 50 that is between first end 60 and second end 62.

A brace 70 has first and second ends 72 and 74 respectively and is also connected to rails 48 and 50. First end 72 of brace 70 is connected to rail 48 at a longitudinal position between first and second ends 56 and 58 and second end 74 of brace 70 is connected to rail 50 at a longitudinal position along rail 50 between first and second ends 60 and 62. Brace 70 cooperates with step 64 to maintain rails 48 and 50 in substantially parallel relationship with respect to each other.

The portable step of FIGS. 1–4 further includes first and second connecting members 76 and 78. Connecting members 76 and 78 are attached to anchor 20 and to rails 48 and 50 respectively to connect the rails to truck 14. In the example of the preferred embodiment, connecting members 76 and 78 are flexible members such as chains. Connecting member 76 has first and second ends 80 and 82 with first end 80 attached to anchor 20 and second end 82 attached to the first end 56 of rail 48. Connecting member 78 has first and second ends 84 and 86 with first end 84 attached to anchor 20 and second end 86 attached to the first end 60 of rail 50. While connecting members 76 and 78 are shown as chains in the example of the preferred embodiment, other flexible members such as steel cables could also be used.

Figure 4:
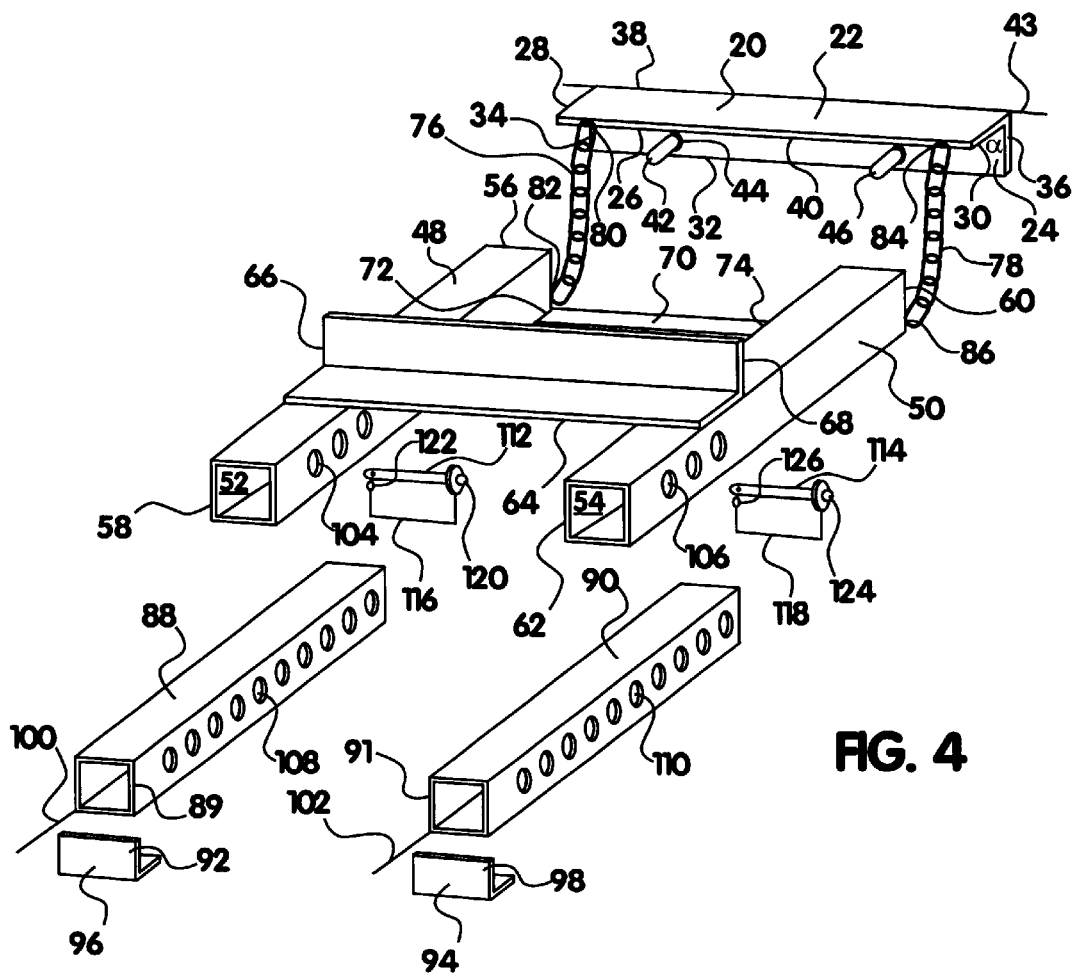
FIG. 4 is a partially exploded projection of the step that is shown in FIGS. 1, 2 and 3 with portions thereof disassembled to better disclose the details thereof.
Figure 5:
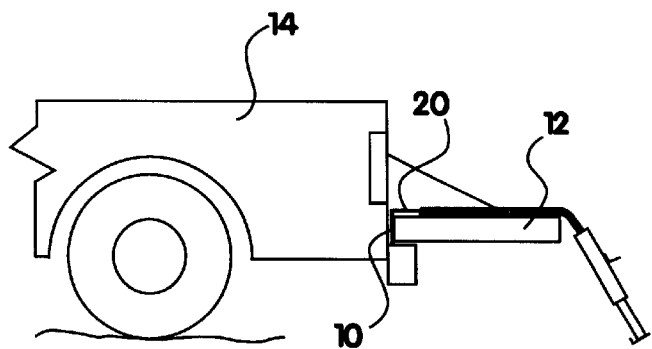
FIG. 5 is a side view of an alternative embodiment of the portable step that is shown in FIG. 1 wherein the chains in FIG. 1 are replaced by cables.

As shown most specifically in FIGS. 3 and 4, the portable step of the presently disclosed invention is adjustable and includes means for securely supporting rails 48 and 50 from an uneven surface. In the preferred embodiment, rails 48 and 50 cooperate with extension members 88 and 90 respectively. Extension members 88 and 90 are slidably connected to rails 48 and 50 respectively. More specifically, extension member 88 has a cross-section that corresponds to the shape of the cross-section of passageway 52 of rail 48 with extension member 88 being dimensioned such that it is internally received in the passageway 52 of rail 48 and is longitudinally slidable therein. Similarly, extension member 90 has a cross-section that corresponds to the shape of the cross-section of passageway 54 of rail 50 with extension member 90 being dimensioned such that it is internally received in the passageway 54 of rail 50 and is longitudinally slideable therein. In this way, extension members 88 and 90 slidably extend from rails 48 and 50 respectively in telescoping arrangement with extension member 88 having an end 89 that protrudes from rail 48 and extension member 90 having an end 91 that protrudes from rail 50.

In order to better support rails 48 and 50, extension members 88 and 90 are provided with feet 92 and 94 respectively. Foot 92 is connected to the end 89 of extension member 88 that protrudes from rail 48 and foot 94 is connected to the end 91 of extension member 90 that protrudes from rail 50. Feet 92 and 94 have respective contact surfaces 96 and 98 which, in the example of the preferred embodiment, define planar surfaces that are oriented in a generally orthogonal direction with respect to the longitudinal axes 100 and 102 of extension members 88 and 90. However, different orientations and contact surfaces with non-planar shapes are also within the scope of the presently disclosed invention.

To secure extension members 88 and 90 longitudinally with respect to rails 48 and 50, the presently disclosed adjustable step includes means for locking the extension members in a longitudinal position. In the preferred embodiment, first and second rails 48 and 50 have through holes 104 and 106 respectively. Correspondingly, extension members 88 and 90 have at least one and preferably a plurality of through holes 108 and 110 respectively. The through holes 108 of the extension member 88 are arranged in a linear array and are angularly located with respect to the axis 100 such that through holes 108 align with through hole 104 of rail 48 at times when extension members 88 are located at a given longitudinal position with respect to rail 48.

The through holes 110 of the extension member 90 are arranged in a linear array and are angularly located with respect to the axis 102 such that through holes 110 align with through hole 106 of rail 50 at times when extension member 90 is located at a given longitudinal position with respect to the rail 50. In this way, extension members 88 and 90 can be longitudinally adjusted in correspondence with the available support surface for feet 92 and 94 so that the step is afforded greater stability and support. When the extension member 88 is longitudinally located such that through holes 104 coincide with through holes 108, extension member 88 is longitudinally secured in rail 48 by inserting a pin 112 through holes 104 and 108. Similarly, when the extension member 90 is longitudinally located such that through holes 106 coincide with through holes 110, extension member 90 is longitudinally secured in rail 50 by inserting a pin 114 through holes 106 and 110.

In the example of the preferred embodiment that is disclosed in FIG. 4, pins 112 and 114 further include locking brackets 116 and 118 respectively. Locking brackets 116 and 118 are formed of wire or other flexible material. One end of locking bracket 116 is connected to the head 120 of pin 112. The opposite end of locking bracket 116 is formed in a loop such that it can be extended and placed over the tip 122 of pin 112. Similarly, one end of locking bracket 118 is connected to the head 124 of pin 114. The opposite end of locking bracket 118 is formed in a loop such that it can be extended and placed over the tip 126 of pin 114. In this way, locking brackets 116 and 118 secure pins 112 and 114 within the respective holes of extension members 88 and 90 and rails 48 and 50.

To provide greater selectivity in longitudinally positioning the extension member 88 and 90 with respect to the rails 48 and 50, through hole 104 and 106 in rails 48 and 50 respectively can be a multiple of holes in the form of a linear array of holes such as show in the embodiment of FIG. 4. This allows greater selectivity in the positioning of pin 112 in holes 104 and 108 and the positioning of pin 114 in holes 106 and 110.

While a presently preferred embodiment of the invention has been described herein, the subject invention is not limited thereto but can also be variously embodied within the scope of the following claims.

What is claimed is:

1. A portable step for use with a vehicle, said step comprising:

an L-shaped anchor that is adapted to be releasably connectable to said vehicle, said anchor having at least one member that is adapted to releasably engage at least one hole in said vehicle;

first and second flexible members, each of said flexible members having respective first and second ends with the first end of each flexible member being connected to said anchor;

first and second rails that respectively have first and second ends, the first end of said first rail being connected to the second end of the first flexible member, and the first end of said second rail being connected to the second end of the second flexible member;

at least one step that is connected to the first and second rails, said step being connected to the first rail at a longitudinal position of said first rail that is located between the first and second ends of the first rail, said step also being connected to the second rail at a longitudinal position of said second rail that is located between the first and second ends of the second rail;

first and second extension members, said first extension member being slidably connected to the first rail and said second extension member being slidably connected to the second rail, each of said extension members being independently adjustable;

first locking means for securing said first extension member at a longitudinal position relative to said first rail wherein the first extension member projects a selected longitudinal distance from the second end of said first rail; and second locking means for securing said second extension member at a longitudinal position relative to said second rail wherein the second extension member projects a selected longitudinal distance for the second end of said second rail.

2. The portable step of claim 1 where said anchor is in the shape of two strips that are joined together along a longitudinal edge, each of said strips defining a respective face with the face of one strip cooperating with the face of the other strip to define an angle between the faces of said strips that is substantially 90°.

3. The portable step of claim 2 wherein the member of said anchor that is adapted to releasably engage the vehicle comprises at least one pin that is adapted to engage a hole in the vehicle.

4. The portable step of claim 1 wherein said first and second flexible members comprise respective lengths of chain.

5. The portable step of claim 1 wherein first and second rails are tubular members that define an internal passageway for receiving the first and second extension members respectively.

6. The portable step of claim 5 wherein said extension members are internally received in the internal passageway of the first and second rails such that said extension members extend from the respective rails in telescoping arrangement.

7. The portable step of claim 6 wherein said first and second rails have at least one hole and wherein said first and second extension members each have at least one hole, each of said locking means respectively cooperating with the hole in the first and second rail and at least one hole in the first and second extension members where said hole in said extension member is in registry with the hole in the respective rail to lock the extension member in longitudinal position with respect to the position of the rail.

8. The portable step of claim 7 herein said extension members have an array of holes, each of said holes in said array being in registry with the hole in the rail when the extension is in a different longitudinal position.

9. The portable step of claim 8 wherein each of said rails includes a respective linear array of holes, each of said holes being in registry with one of the holes of said extension member when said extension member is at a different longitudinal position with respect to said rail.

10. The portable step of claim 1 wherein said first and second extension members further comprise feet that are connected to the second ends of the first and second extension members respectively, each of said feet defining a contact surface.

11. A portable step for use with a vehicle, said step comprising:

an L-shaped anchor that is adapted to be releasably connectable to said vehicle, said anchor having at least one member that is adapted to releasably engage a hole in said vehicle;

first and second cables, each of said cables having respective first and second ends with the first end of each cable being connected to said anchor;

first and second rails that respectively have first and second ends, the first end of said first rail being connected to the second end of the first cable and the first end of said second rail being connected to the second end of the second cable;

at least one step that is connected to the first and second rails, said step being connected to the first rail at a longitudinal position of said first rail that is located between the first and second ends of the first rail, said step also being connected to the second rail at a longitudinal position of said second rail that is located between the first and second ends of the second rail;

first and second extension members, said first extension member being slidably connected to the first rail and the second extension member being slidably connected to the second rail, said first extension member being adjustable independently of said second extension member;

first locking means for securing said first extension member at a longitudinal position relative to said first rail; and second locking means for securing said second extension member at a longitudinal position relative to said second rail.

12. An portable step for use with a vehicle, said step comprising:

an L-shaped anchor that is adapted to be releasably connectable to said vehicle, said anchor having at least one member that is adapted to releasably engage a hole in said vehicle;

first and second flexible members, each of said flexible members having respective first and second ends with the first end of each flexible member being connected to said anchor;

first and second rails that respectively have first and second ends, the first end of said first rail being connected to the second end of the first flexible member and the first end of said second rail being connected to the second end of the second flexible member;

at least one step that is connected to the first and second rails, said step being connected to the first rail at a longitudinal position of said first rail that is located between the first and second ends of the first rail, said step also being connected to the second rail at a longitudinal position of said second rail that is located between the first and second ends of the second rail;

first and second extension members, said first extension member being slidably connected to the first rail and the second extension member being slidably connected to the second rail, said first extension member being adjustable independently of said second extension member;

first locking means for securing said first extension member at a longitudinal position relative to said first rail; and second locking means for securing said second extension member at a longitudinal position relative to said second rail.

13. The portable step of claim 12, said step further comprising:

at least one brace that maintains said first and second rails in substantially parallel relationship, said brace being connected to said first rail at a longitudinal position on said first rail that is located between said first and second ends of said first rail, said brace also being connected to said second rail at a longitudinal position on said second rail that is located between said first and second ends of said second rail.

14. The portable step of claim 12 wherein said first and second flexible members are comprised of first and second chains respectively.

15. The portable step of claim 12 wherein said first and second extension members are respectively received in the internal passageway of the first and second rails such that said extension members extend from the respective rails in telescoping arrangement.

16. The portable step of claim 15 wherein said first and second rails have at least one hole and wherein said first and second extension member have at least one hole, said first and second locking means respectively cooperating with the hole in the first and second rails and also respectively with at least one hole of the extension members where the hold in the extension member is in registry with the hole in the rail to lock the extension member in longitudinal position with respect to the rail.

17. The portable step of claim 16 wherein said first and second extension members each have an array of holes, each of said holes in said array being in registry with the hole in the corresponding rail when the extension member is in a different longitudinal position.

18. The portable step of claim 16 wherein said first locking means comprises a first pin that engages the holes of said first extension member and wherein said second locking means comprises a second pin that engages the holes of said second extension member.

19. The portable step of claim 18 wherein said first locking means further includes a spring having one end that is pivotally mounted to the head end of the first pin, said spring also having a second end that defines a loop that receives the opposite end of the first pin, and wherein said second locking means further includes a spring having one end that is pivotally mounted to the head end of the second pin, said spring also having a second end that defines a loop that receives the opposite end of the second pin.

20. A portable step that is adapted for use with a vehicle, said step comprising:

an L-shaped anchor that is adapted to be releasably connectable to said vehicle, said anchor having at least two pins that extend from the anchor, said pins being adapted to releasably engage respective holes in the vehicle at times when the step is connected to said vehicle;

first and second flexible members, each of said flexible members having elongated bodies that are defined between respective first and second ends, with the first end of each flexible member being connected to said anchor;

first and second rails that respectively have first and second ends, the first end of said first rail being connected to the second end of the first flexible member and the first end of said second rail being connected to the second end of the second flexible member, each of said rails having a respective body that defines a tubular member that is located between the first and second ends and that defines an internal passageway;

at least one step that is connected to the first and second rails, said step being connected to the first rail at a longitudinal position of said first rail that is located between the first and second ends of the first rail, said step also being connected to the second rail at a longitudinal position of said second rail that is located between the first and second ends of the second rail;

first and second extension members, each of said first and second extension members being internally received in the internal passageway of the first and second rails respectively such that said first and second extension members extend from the respective rails in telescoping arrangement, said first extension member being adjustable independently of said second extension member;

first locking means for securing said first extension member at a longitudinal position relative to said first rail; and second locking means for securing said second extension member at a longitudinal position relative to said second rail.

* * * * *